W. E. ARMISTEAD.
ICE MAKING APPARATUS.
APPLICATION FILED AUG. 22, 1910.

1,027,304.

Patented May 21, 1912.

2 SHEETS—SHEET 1.

Witnesses
W. May. Durall.

Inventor
W. E. Armistead
by Wilkinson,
Fisher and
Witherspoon
his Attorneys.

W. E. ARMISTEAD.
ICE MAKING APPARATUS.
APPLICATION FILED AUG. 22, 1910.

1,027,304.

Patented May 21, 1912.
2 SHEETS—SHEET 2.

UNITED STATES PATENT OFFICE.

WILLIAM E. ARMISTEAD, OF SANDERSVILLE, GEORGIA.

ICE-MAKING APPARATUS.

1,027,304.  Specification of Letters Patent.  Patented May 21, 1912.

Application filed August 22, 1910. Serial No. 578,322.

*To all whom it may concern:*

Be it known that I, WILLIAM E. ARMISTEAD, a citizen of the United States, residing at Sandersville, in the county of Washington and State of Georgia, have invented certain new and useful Improvements in Ice-Making Apparatus; and I do hereby declare the following to be a full, clear, and exact description of the invention, such as will enable others skilled in the art to which it appertains to make and use the same.

This invention relates to improvements in apparatus for manufacturing ice, and the object of the invention is to provide means for manufacturing artificial ice from raw water that is clear and transparent and free from impurities, and which may be frozen very quickly and readily harvested.

The broad object of the invention is to so arrange the freezing cans that the ice is formed from opposite ends thereof, approaching the middle portion of the can, where suitable means are provided for maintaining a central wall or zone of unfrozen water, so that the ice blocks are free from cores containing impurities and are molded in blocks not requiring the necessity of sawing the formed ice.

It will be understood that the invention is not restricted to the exact details shown and described, but for the purpose of disclosure reference is had to the accompanying drawings illustrating a preferred arrangement embodying my present invention, in which drawings like characters designate the same parts in the several views, and in which—

Figure 1:
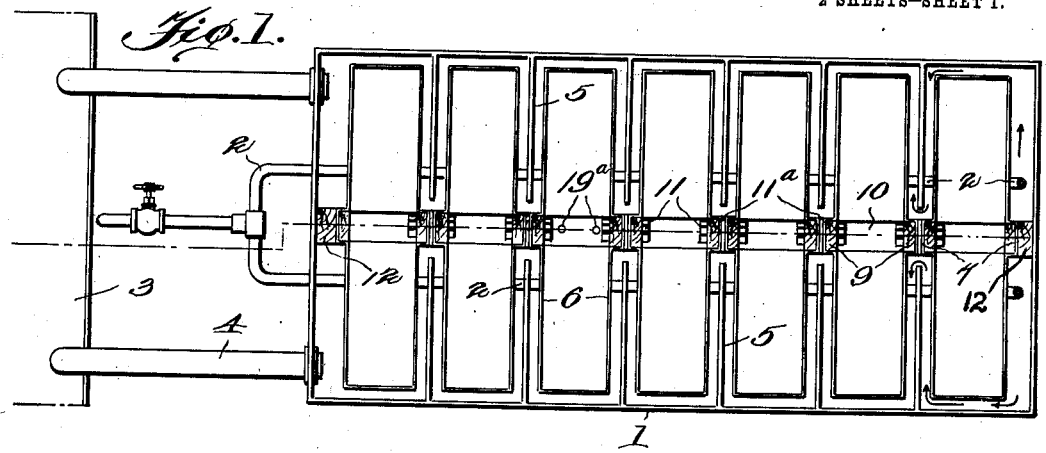
Figure 2:
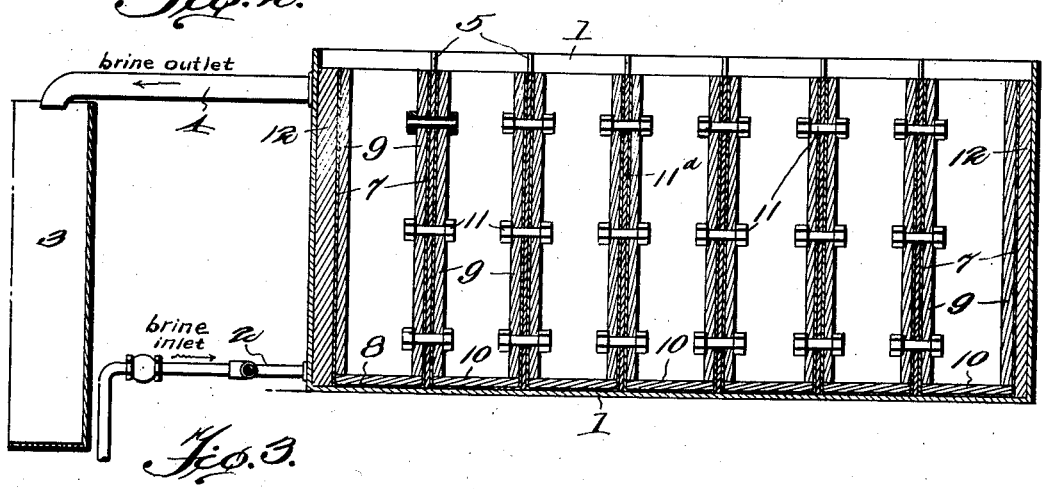
Figure 3:
Figure 4:
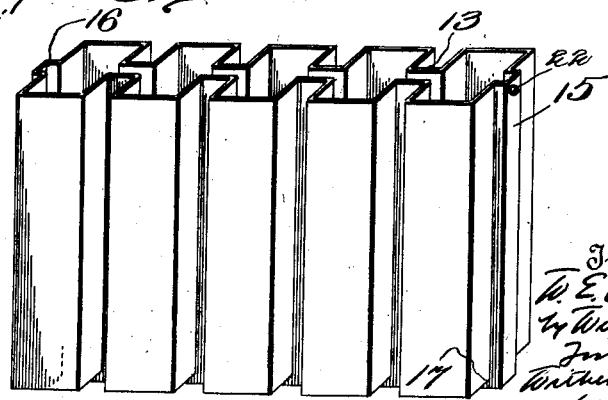

Figure 1 is a plan view showing a plurality of ice forming cans, of a specific construction, arranged in an outer brine containing tank. Fig. 2 is a longitudinal section along the dotted line in Fig. 1. Fig. 3 is a bottom plan view of one of said series of ice forming cans. Fig. 4 is a perspective view of a construction illustrating a gang of ice forming cans, and which is a preferred arrangement for practical use. Fig. 5 is a plan view of the construction shown in Fig. 4, with insulation applied, but with the central bottom strip of insulation omitted from its channel to illustrate a perforated raw water inlet pipe. Fig. 6 is a vertical cross section on the line 6—6 of Fig. 5. Fig. 7 is a cross section through the bottom layer of insulation along the line 6—6 of Fig. 5. Fig. 8 is a detail fragmentary view showing the abutting can ends as illustrated in Fig. 1, and Fig. 9 is a fragmentary perspective view looking toward the inside bottom of a can and showing more clearly the bottom insulation containing channel.

1 designates an outer tank provided with induction pipes 2 introducing the cooling medium, such as brine, from any suitable source or tank 3, the outer tank 1 being also provided with the overflow pipes 4 leading back to the brine containing tank.

5 designates a plurality of baffle plates extending inwardly and laterally from opposite sides of the tank, each baffle plate being disposed in the same plane as the baffle plate opposite, and terminating at a sufficient distance from the center of the tank to provide a passageway of substantial width between their opposed edges.

6 designates the ice forming cans, which are of elongated rectangular form, of a length a little less than the width of the outer tank and of a width a little less than the distance between each pair of baffle plates on the same side of the outer tank, so that a space is left between the can, the baffle plates and the outer tank for free circulation of the cooling brine.

Centrally between the cans is arranged spacing media, containing as an element non-heat conducting material and disposed above a similar element of non-heat conducting material extending longitudinally along the bottom of the outer tank. This arrangement might consist of a strip of wood or other non-heat conducting material along the inside bottom of the outer tank, and having upright posts of wood or other non-heat conducting material mounted on top of said longitudinal strip between the edges of each opposite pair of baffle plates. In the drawings, however, an arrangement is shown whereby the cans 6 are provided on their central faces with hollow offsets or channels 7 registering with a bottom channel 8, forming troughs for the reception of insulating material 9 and 10. The walls of these vertical channels and the insulating material are perforated to receive suitable tying bolts 11 for securing the cans in series against displacement in the outer tank. As seen from the upper left-hand corner of Fig. 2 the bolts 11 are hollow for a purpose hereinafter referred to, and it will also be seen that a strip of suitable material 11ª is preferably placed between the faces of the offsets 7 where they abut, to provide a water seal between the opposed channels formed by the cans and baffle plates. The outer tank may also be provided with vertical end blocks 12 of insulating material, against which the end channels 7 abut.

In the construction shown in Fig. 4 the cans are joined together by the integral walls 13 and a continuous channel 15 and 16 extending vertically of the end cans and joining a channel 17 longitudinally along the bottom of the series of cans is filled flush with suitable insulating material.

In Fig. 5 the same arrangement of inner ice cans is shown as is shown in Fig. 4, 14 and 14ª showing suitable surfaces of insulating material extending along the vertical faces of the integral wall 13. In this view the insulating material 17ª (Fig. 7) is shown omitted from the bottom channel 17 in order to illustrate more clearly a perforated inlet pipe 18 having a plurality of upwardly directed nipples 19 disposed adjacent the vertical insulating surfaces of the walls 13. As shown in Fig. 7 the insulation 17ª is grooved out on its bottom, as at 20, to snugly fit over the pipe 18, and is also provided with apertures 21 to receive the nipples 19.

While I have shown the nipples disposed adjacent the walls 13 it will also be understood that the pipe may be provided with other injection orifices if desired, but in addition to the object of always providing a continuous flow or agitation of raw water in the ice forming chambers the particular location of the nipples 19 accomplishes a further end in keeping the water more violently agitated adjacent the surfaces 13 where it is desired that there be no possible ice formation.

It will be seen from Figs. 5 and 6 that the raw water inlet pipe 18 is arranged in the bottom of the channel extending longitudinally along the bottom of the outer tank, but where the single can construction is used, as shown in Figs. 1 and 2, the arrangement would be such that after the single cans were assembled and secured together the inlet pipe 18 would be secured along the outside bottom of the channels 8, in which event the pipe would be fitted with a socket or nipple coöperating with a complementary element on the bottom of the tanks to form a water tight joint, or any other suitable water tight joint might be employed. In this construction, of course, the inlet orifices could not be arranged in the same position as shown in Fig. 5, as the insulating material 9 would prevent this, so that the inlet orifices would be arranged immediately adjacent this insulating material 9, as indicated at 19ª, Fig. 1.

22 designates an outlet for the raw water which is conducted by a suitable pipe, not shown, to a receptacle in which it is either stored or led back again after filtration and further cooling to the inlet pipe 18. In operation, therefore, it will be seen that the incoming brine being discharged in the space between the outer tank and the first ice forming can, and on both sides of the bottom dividing wall of insulating material, the flow will be in the direction of the arrows until the opposite end of the outer tank is reached, when the overflow passes out through the pipes 4.

During the formation of ice a central wall or zone of unfrozen water is maintained in each ice forming compartment, owing to the insulating material referred to and the raw water agitating means comprising the inlet pipe and jet orifices, and the ice forms from opposite sides of each compartment toward this wall of unfrozen water.

Any suitable means may be provided for drawing off the water, if desired, after the ice blocks have been formed, and communication is had between the several ice forming cans of the series, Figs. 1 and 2, from the fact that the bolts 11 are open-ended. For instance the inlet pipe 18 may be provided with a suitable cock for allowing the water in the tank to be drained therethrough.

What I claim is:—

1. In an apparatus for manufacturing ice, an outer tank provided with opposed alining baffle plates having a substantial space between their opposed edges, in combination with a plurality of ice forming chambers the adjacent walls of which are spaced apart and straddle said baffle plates, and means for circulating a cooling medium in said outer tank, substantially as described.

2. In an apparatus for manufacturing ice, an ice forming receptacle provided on opposite walls with inwardly opening channels and on its bottom with an inwardly opening channel connecting said opposite wall channels, said channels being filled with insulating material for preventing the formation of ice across said channels, substantially as described.

3. In an apparatus for manufacturing ice, the combination of a brine tank, a plurality of ice forming receptacles having their side walls spaced apart located in said brine tank, and means for injecting raw water into said ice forming receptacles in the line of a plane passing longitudinally of said receptacles, and means for conducting off said raw water at a predetermined level, substantially as described.

4. In an apparatus for manufacturing ice, the combination of an outer tank provided with opposed alining baffle plates having a substantial space between their edges, a plurality of ice forming receptacles having their side walls spaced apart and straddling said baffle plates, means for circulating a cooling medium in said brine tank, and means for injecting raw water into said ice forming receptacles in a plane passing between said baffle plates, and means for conducting off said raw water at a predetermined level, substantially as described.

5. In an apparatus for manufacturing ice, the combination of an outer tank provided with opposed alining baffle plates having a substantial space between their edges, a plurality of ice forming receptacles having their side walls spaced apart and straddling said baffle plates, means for circulating a cooling medium through said brine tank, and means for introducing raw water into said receptacles at a position between the space formed by the opposed edges of said baffle plates, and means for conducting off said raw water at a predetermined level, substantially as described.

6. In an apparatus for manufacturing ice, the combination of a brine tank, an inner tank comprising a plurality of ice forming receptacles having their adjoining side walls spaced apart to form hollow partitions having opposed spaced inner faces forming a passage longitudinally of said inner tank, means for injecting raw water in said longitudinal passage, and means for conducting off said raw water at a predetermined level, substantially as described.

7. In an apparatus for manufacturing ice, the combination of a brine tank, an inner tank comprising a plurality of ice forming receptacles having their adjoining side walls spaced apart to form hollow partitions having opposed spaced inner faces forming a passage longitudinally of said inner tank, facings of insulation for said inner faces, means for injecting raw water in said longitudinal passage between the opposed inner faces, and means for conducting off said raw water at a predetermined level, substantially as described.

8. In an apparatus for manufacturing ice, the combination of a brine tank, an inner tank provided with inwardly projecting hollow partitions with opposed inner end walls spaced apart and provided with a bottom channel below the space formed by said spaced end walls, a raw water inlet pipe extending along said channel, insulating material in said channel and covering said pipe, orifices being provided in said pipe and said insulating material discharging in the zone above said channel, and means for conducting off the raw water at a predetermined level, substantially as described.

In testimony whereof, I affix my signature, in presence of two witnesses.

WILLIAM E. ARMISTEAD.

Witnesses:
W. M. GOODWIN,
C. D. THIGPEN.